Aug. 4, 1925.

G. M. WALKER 1,548,231

BASKET FORMING MACHINE

Filed June 10, 1921    5 Sheets-Sheet 1

Inventor
Gaines M. Walker
By F. R. Cornwall Atty.

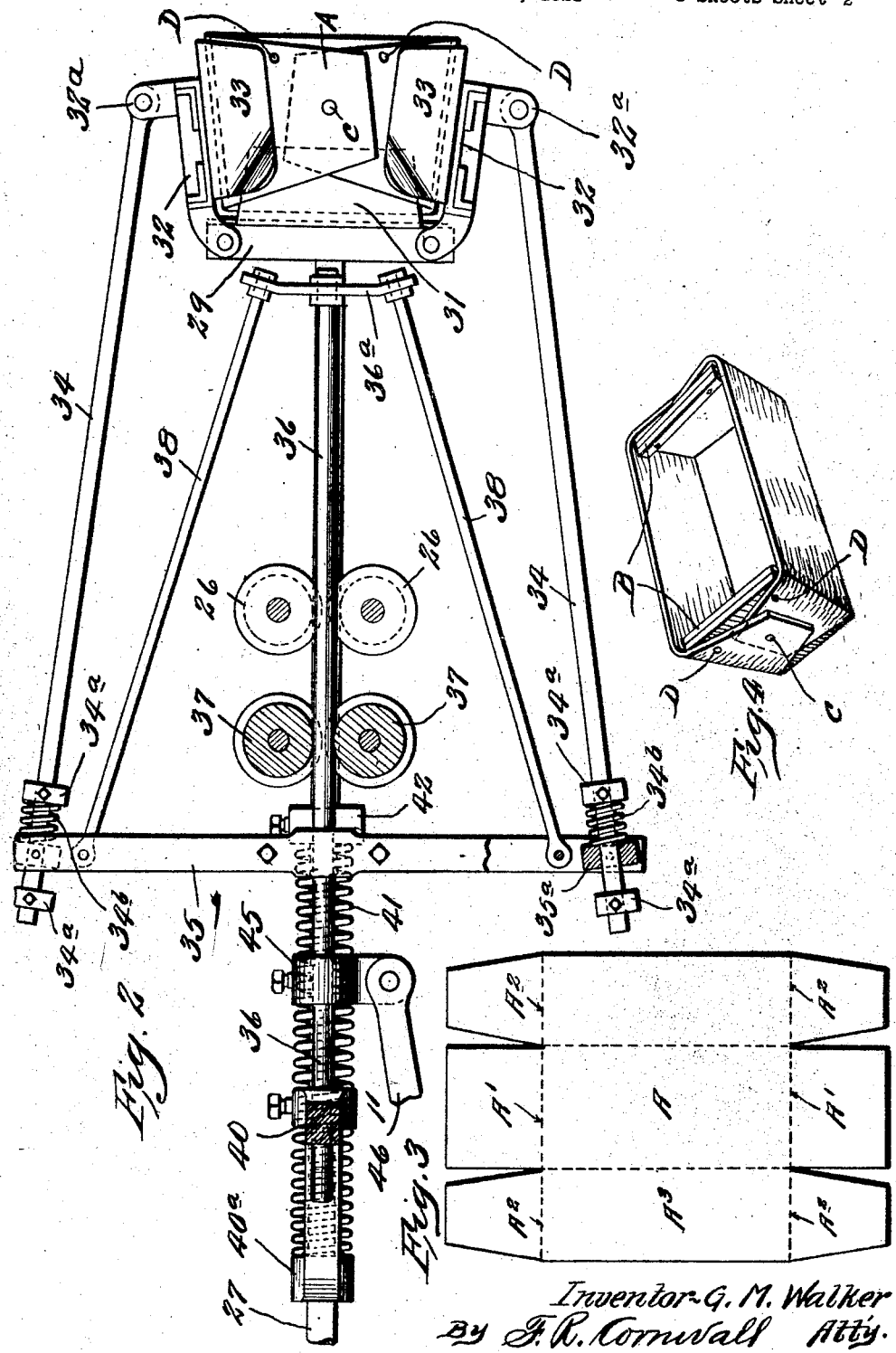

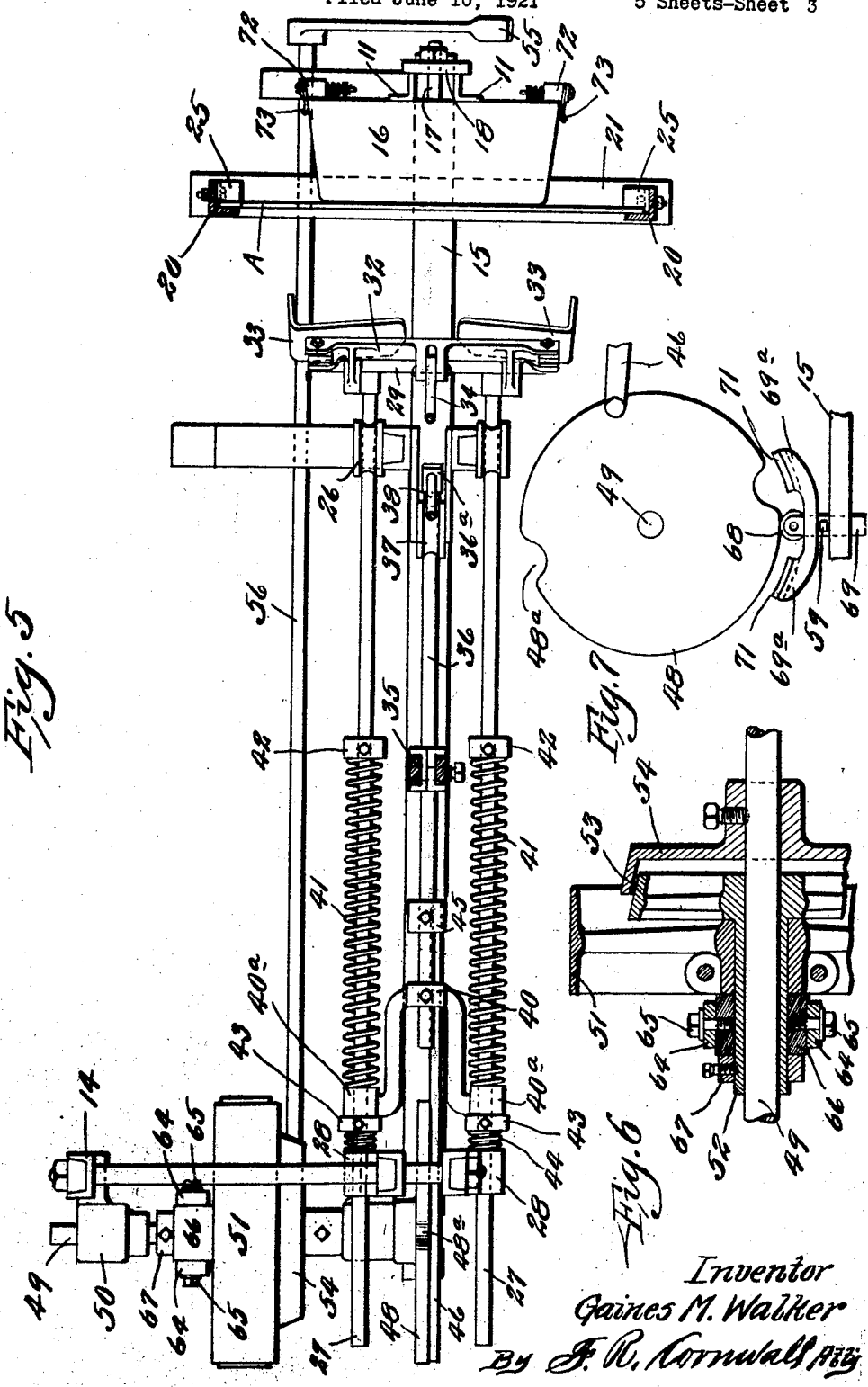

Aug. 4, 1925.   1,548,231
G. M. WALKER
BASKET FORMING MACHINE
Filed June 10, 1921     5 Sheets-Sheet 4
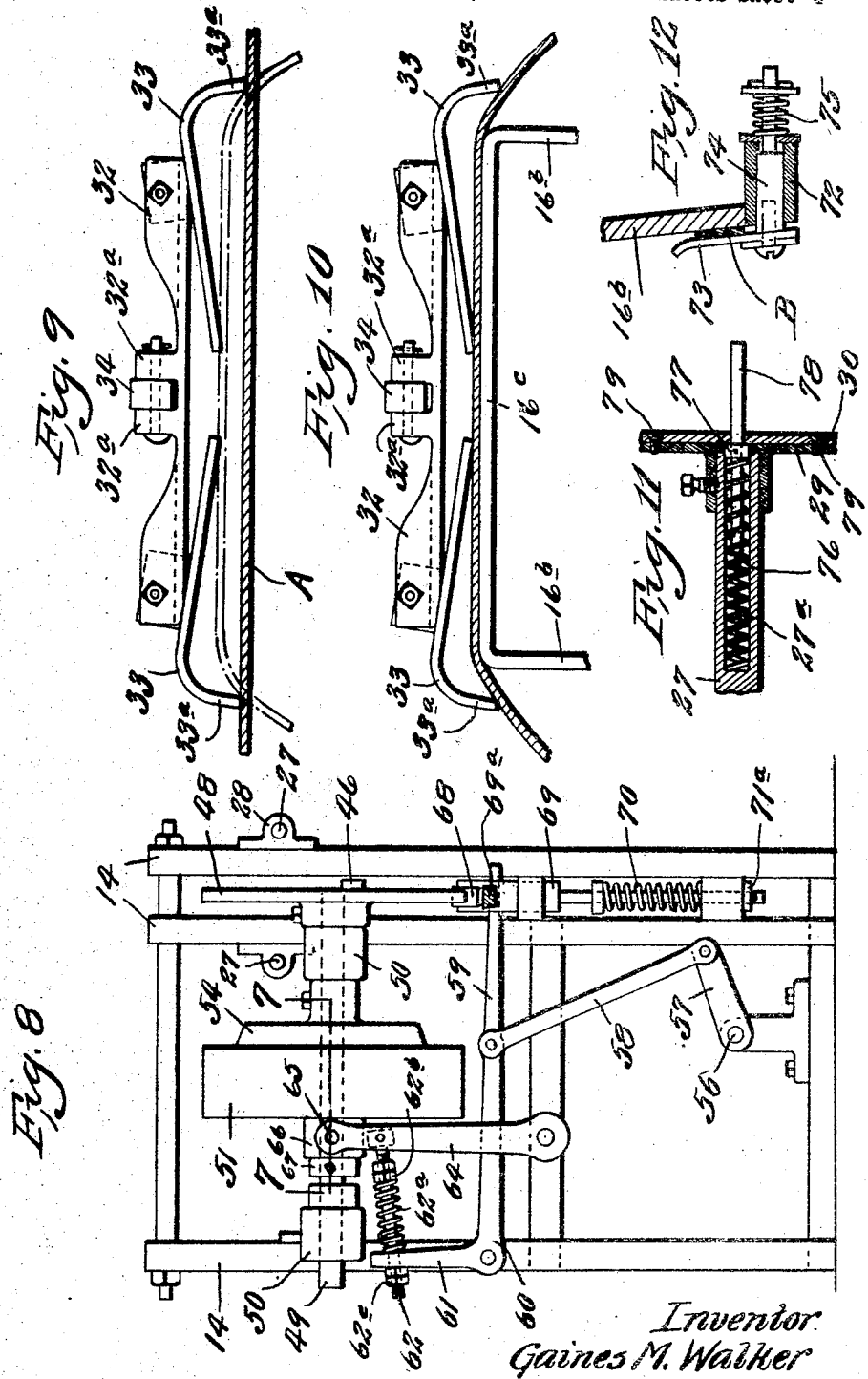
Inventor
Gaines M. Walker
By F. R. Cornwall Atty.

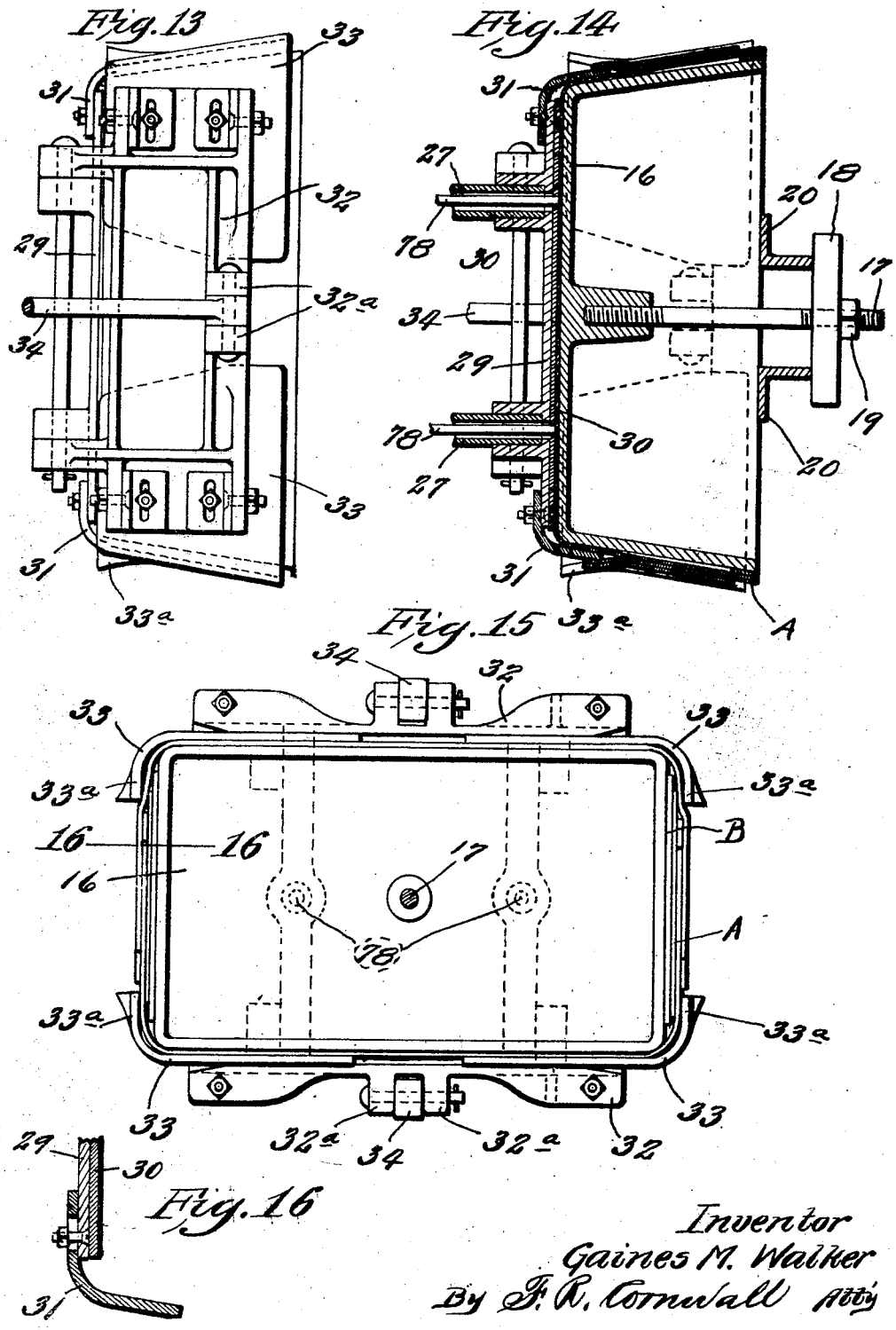

Patented Aug. 4, 1925.

1,548,231

UNITED STATES PATENT OFFICE.

GAINES M. WALKER, OF ST. LOUIS, MISSOURI.

BASKET-FORMING MACHINE.

Application filed June 10, 1921. Serial No. 476,432.

*To all whom it may concern:*

Be it known that I, GAINES M. WALKER, a citizen of the United States, residing at St. Louis, Missouri, have invented a certain new and useful Improvement in Basket-Forming Machines, of which the following is a full, clear, and exact description, such as will enable others skilled in the art to which it appertains to make and use the same, reference being had to the accompanying drawings, forming part of this application.

This invention relates to machines for forming baskets, boxes, and like containers. The objects of the invention are to provide a machine of the class described which is adapted to receive a blank of suitable material, such as veneer, composition or paper, and which machine when operated will form said blank into a desired shape and will retain the basket so shaped in position while the operator secures the folded side walls of the basket together, or to suitable basket reinforcing means.

Further objects of the invention are to provide a machine for shaping baskets having differentially operable forming plates whereby certain portions of said blank are operated upon in advance of other portions of said blank.

Still further objects of my invention are to provide a basket forming machine having drive-controlling means which cause said machine to be intermittently operated, in order to hold a basket in formed position so that the side walls thereof can be secured together.

With the foregoing and other objects in view, my invention consists in certain novel features of construction and arrangements of parts hereinafter more fully described and claimed, and illustrated in the accompanying drawings, in which,—

Figure 2 is a detail view showing the forming plates in co-operative position with the stationary forming member.

Figure 3 is a plan view of the blank from which the basket is shaped.

Figure 4 is a perspective view of the finished basket.

Figure 5 is a plan view of the machine.

Figure 6 is a horizontal cross section taken longitudinally of the driving shaft, showing the clutching members and means for operating the same.

Figure 7 is an end elevation of the driving connections with the braking member moved into a disengaged position.

Figure 8 is a rear end elevation of the machine.

Figure 9 is a detail view of the rocking plates in position to engage the blank.

Figure 10 is a similar view showing the rocking plates in position to shape the outer portions of the blank.

Figure 11 is a longitudinal cross-sectional view on line 11—11 of Figure 1.

Figure 12 is a longitudinal cross-section on line 12—12 of Figure 1.

Figure 13 is a plan view of the stationary forming block and the forming plates positioned thereon.

Figure 14 is a horizontal cross section through said block and said plates.

Figure 15 is a front elevational view of the block and the plates.

Figure 16 is a horizontal cross-section taken on line 16—16 of Figure 15.

Figure 1:
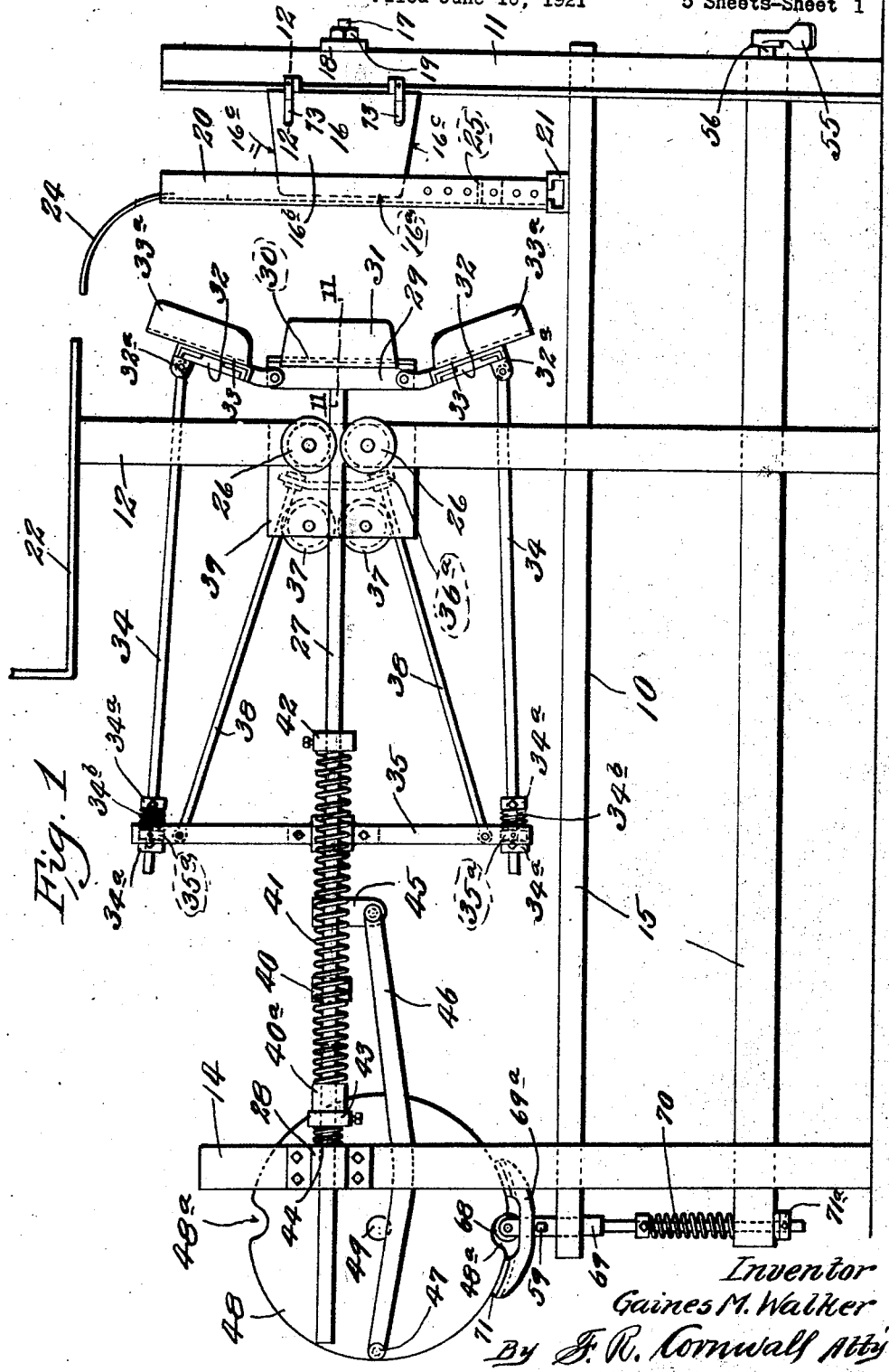
Figure 1 is a side elevation of the machine.

Referring by numerals to the accompanying drawings, 10 indicates the supporting framework of the machine, said framework comprising a pair of front upright members 11, intermediate uprights 12, and rear upright members 14, and horizontally disposed members 15. A shaping block or anvil 16 is adjustably carried on the inner sides of the front uprights 11 by means of a bolt 17, which has one end seated in the block and its opposite end passing through a cross-piece 18 engaging the outer sides of uprights 12, so that the block can be clamped on said uprights by means of said cross-piece and a nut 19 threaded onto the outer end of bolt 17 and forced against cross-piece 18. Block 16 can be of any suitable size and shape, and, in the present instance, is box shaped having a rear wall 16$^a$, tapering end wall 16$^b$ and tapering side walls 16$^c$.

On each side of the block and rearwardly thereof are vertically disposed angles or guide members 20, the lower ends of which are adjustably seated in a horizontal bar 21 which is transversely carried on one of the horizontal members 15. Uprights 12 are provided at their upper ends with a platform 22 on which a supply of basket blanks can be supported within the convenient reach of the operator. The upper ends of guides 20 carry upwardly and rearwardly curved bars 24 which are designed to facilitate the positioning of the blank in guides 20. Adjustably mounted on the inner sides of these guides 20 are stops or brackets 25 which are arranged to support and determine the proper location of the blanks relative to the shaping block and the forming plates.

On the outer side of each intermediate upright 12 are horizontally journaled a pair of rollers 26 spaced vertically from each other to provide antifriction bearings for a pair of horizontally disposed rods 27 the rear ends of which are slidably mounted in bearings 28 fixed to the rear uprights 14. The forward ends of these rods carry a detachable frame 29 which faces and is in alinement with the rear wall 16ª of block 16 and detachably secured to a frame is a plate 30 to the ends of which are adjustably fixed end forming plates 31 designed to cooperate with the end wall 16ᵇ of block 16.

Hinged to the upper and lower portions of frame 29 and oppositely disposed to each other are frames 32 on each of which are pivotally arranged a pair of rocking corner plates 33 which are designed to co-operate with the end walls 16ᵇ and side walls 16ᶜ. Normally, rocking plates 33 occupy positions with their inner ends tilted forward, as shown in Figures 9 and 10, and during the forming operations said plates are rocked on their pivots so as to occupy positions shown in Figure 15.

Each frame 32 is provided with ears or lugs 32ª to which are pivotally connected the outer ends of rods 34, the rear ends of which are arranged in the outer ends of a vertically disposed cross-arm 35 adjustably fixed to a horizontally disposed rod 36, which rod is arranged between rods 27 and substantially on the same horizontal plane therewith.

The rear ends of rods 34 are, preferably, yieldingly mounted in cross-arm 35 by means of collars 34ª adjustably fixed to each rod and on each side of a bearing 35ª which has a rocking bearing in each end of said cross-arm. Interposed between the forward collar 34ª and the bearing is a spring 34ᵇ which forms a yielding operative connection between cross-arm 35 and rod 34.

The forward end of rod 36 has slidable bearing between a pair of vertically arranged antifriction rollers 37 journaled on plates 39 which project rearwardly from front uprights 11. This forward end of rod 36 is further reinforced by truss rods 38 which have their forward ends seated in a frame 36ª carried by the forward end of rod 36 and have their rear ends secured to cross-arm 35. The rear end of rod 36 is adjustably secured to the central portion of a horizontally disposed U-shaped member or yoke 40, the ends of which are provided with bearings 40ª, which are slidably supported on rods 27. Resting against each bearing 40ª and positioned forwardly thereof are coiled springs 41 which have their forward ends bearing against collars 42 adjustably mounted on rods 27.

Abutting against the rear end of each bearing 40ª is a collar 43. Also adjustably mounted on each rod 27 and interposed between said collars and bearings 28 are short coiled springs 44 which act as cushioning means or shock absorbers during the return movement of rods 27 and parts associated therewith.

Adjustably positioned on rod 36 forwardly of the yoke 40 is a collar 45 having a depending lug or ear to which is pivotally connected the forward end of link or pitman 46, the opposite end of which is pivotally mounted by means of a pin 47 on a disk 48 which is fixed to one end of a horizontal shaft 49. This shaft is transversely disposed to the rear of the uprights 14 and is journaled in bearings 50 fixed thereto. Shaft 49 is adapted to be driven by means of a belt pulley 51 secured to a sleeve 52 of a clutch member 53, the latter being loosely mounted on said shaft. This clutch member 53 can be moved laterally by suitable means into a driving engagement with clutch member 54 which is fixed to shaft 49, thereby actuating said shaft and rods 36 and 27 so that the forming plates are moved into a co-operating position with block 16.

The machine operates intermittently, the forming plates being brought into co-operative relation with the block for performing the shaping operation during the first half of the revolution of disk 48 and are retained in this position by the automatic disengagement of clutch members 53 and 54, thus affording the operator the opportunity to secure the folded flaps of the basket together, as shown in Figure 2. After the nailing or stapling operation of the basket is completed, the operator again operates suitable mechanism to interengage clutch members 53 and 54 so as to operate disk 48 whereby the forming plates are released and brought to their normal or home positions, as shown in Figures 1 and 5.

The mechanism for operating the machine intermittently is best illustrated in Figures 1, 5, 7 and 8, and is controlled by the operator by means of a treadle 55 fixed to the forward end of a longitudinally disposed rocking shaft 56, which is journaled in bearings supported on frame 10, and is provided at its rear end with an arm 57. The free end of this arm is pivotally connected to the lower end of a link 58 which is connected at its upper end to arm 59 of a bell-crank 60 pivotally supported on one of the rear uprights 14. The other arm 61 of said bellcrank extends upwardly and forms a bearing for one end of a rod or bolt 62, the other end of which has a rocking bearing in the bifurcated portions of an upwardly presented oscillatory arm 64 pivotally supported by uprights 14. The ends of the bifurcated arm 64 are connected by screws or pins 65 to a collar 66, which is slid on the sleeve 52 of clutch member 53. A collar 67 removably attached to the outer end of sleeve 52 prevents the displacement of collar 66 in one direction, said collar being held against displacement in the opposite direction by the hub of pulley 51. Sleeve 52 and pulley 51 are free to rotate but the longitudinal movement of collar 66 brought about by the rocking motion of the arm 64 will cause the sleeve 52 and clutch member 53 to move longitudinally on shaft 49 so as to operatively engage clutch member 54 fixed to said shaft.

In order to arrest the motion of rod 36 and rods 27 at the proper point so as to properly position the forming plates carried or actuated thereby, disk 48 is provided on its periphery with two diametrically opposed notches or depressions $48^a$, and adapted to be seated in said notches is a roller 68 which is carried by the upper end of a vertically disposed bar 69 movably mounted in the framework 10 and provided with a coiled spring 70 which tends to move said roller 68 into one of the notches $48^a$. The upper end of this bar is provided with extensions $69^a$ having brake shoes 71 arranged to engage the periphery of disk 48 and produce braking action at the time the roller 68 is entering one of the notches $48^a$ thereby effecting a gradual reduction of speed immediately before the disk is stopped by said roller so as to avoid the noise and jarring caused by the sudden stopping of disk 48 when roller 68 is used alone.

Seated in bar 69 is the outer end of arm 59 of bellcrank lever 60, so that when treadle 55 is operated, arm 57 carried by rocking shaft 56 operates bellcrank 60 through link 58, thereby causing the upper end of arm 61 of said bellcrank to operate rod 62 and rock bifurcated arm 64 so as to move clutch member 53 in driving engagement with clutch member 54 and operate the mechanism of the machine. Simultaneously with the engagement of the clutch members 53 and 54, roller 68 is unseated from one of the notches $48^a$ so as to release disk 48 by the downward movement of arm 59, the outer end of which is seated in bar 68. As soon as the treadle is released, spring 70 will hold roller 68 against the periphery of the disk 48 and cause said roller to enter one of the notches $48^a$, thereby restoring bellcrank 60 and bifurcated arm 64 to their normal positions and disengaging clutch members 53 and 54. In order to hold clutch member 53 effectively in engagement with clutch member 54, the coiled spring $62^a$ is placed on rod 62 and bears at one end against arm 61 of the bellcrank 60 and at its other end against the adjustable nut $62^b$ carried on rod 62. A nut $62^c$ is threaded on the outer end of rod 62 and forms an abutment against which the upper end of arm 61 bears during the restoring movement of the bell crank 60, thus restoring rod 62 and reciprocatory arm 64 to their normal positions. By means of nuts $62^b$ and $63^c$, spring $62^a$ can be tensioned so that clutch member 53 is put under pressure to properly engage clutch member 54.

The lower end of bar 69 is provided with a washer $71^a$ faced with leather or rubber which strikes against the underside of one of the horizontal members 15 in which the lower end of said bar is mounted. This washer absorbs the shock and obviates noise when roller 68 moves into one of the notches $48^a$ and bar 69 moves upwardly.

The end walls $16^b$ of block 16 are provided adjacent to their edges with bearings 72 in which are yieldingly mounted retaining fingers 73, preferably, by means of bars 74 movably mounted in bearings 72 and springs 75 positioned on the projecting ends of bars 74 and bearing against washers fixed to said projecting ends. Fingers 73 project inwardly and their ends are slightly curved outwardly so as to facilitate the positioning of reinforcing strips B on blocks 16. These strips are used to stiffen or reinforce the ends of baskets, as illustrated in Figure 4, and are placed in position on blank 16 prior to the performing of the shaping operations of the blank from which the basket is made, and are secured to the basket after the shaping operations by means of staples or nails C.

The ends of rods 27 on which frame 29 is detachably mounted are provided with recesses $27^a$ in which are located coiled springs 76. The outer end of each spring 76 bears against a collar 77 which is fixed to a plunger 78 and thereby tends to hold said plunger in a projected position as shown in Figure 11. The forward or outward movement of the plunger 78 is limited by plate 30 which is removably secured to frame 29 by screws or like fastening means 79.

In the operation of the machine, a blank A, such as illustrated in Figure 3, is positioned in guiding members 20 and brackets 25, and if reinforcing strips B are used, same are placed in position on block 16 and are held thereon by the fingers 73. The treadle 55 is then operated, rocking shaft 56 and causing bellcrank 60 to move clutch member 53 into engagement with clutch member 54 and disengage roller 68 from disk 48. Shaft 49 is caused to operate by means of the belt-driven pulley 51 and rod 36 is moved forwardly through its connection 46. Forward movement of rod 36 causes rods 27 to be moved forwardly by the yoke 40 bearing against springs 41 and thereby exerting pressure on collars 42 fixed to rods 27. The forward movement of rods 27 brings the forming plates carried by frame 29 and frames 32 towards blank A and block 16. Plungers 78 after the completion of which roller 68 will again engage one of the notches 48$^a$ in said disk and disengage driving connections 51 and 53 from shaft 49.

By mounting the plates adjustably on their respective frames, the plates can be adjusted to the various sizes of blanks; or, if desired, the frame 29 can be detached and a frame of the proper size substituted therefor. The adjustable mounting of plates 33 on frames 32 and of plates 30 on frames 29 permits the use of blanks made of various materials and of different thicknesses, by simply adjusting the forming plates 33 and 30 and the adjustable connections between rods 34 and arms 35. The adjustments of collars and yoke furthermore assures the proper functioning of the machine under all conditions.

In adjusting the plates 33 one pair of said plates, in the present instance the upper pair, is set to operate slightly in advance of the opposite pair, so as to fold the corresponding portion of the blank in advance of the opposite portion, thereby avoiding, where said portions when folded overlap each other, the meeting of the ends of said portions, which meeting or bearing of said ends against each other might cause breaking of the blank or otherwise retard the efficient operation of the machine.

A basket forming machine constructed according to my invention is of simple and durable construction, is easy to operate and has a wide range of adjustments whereby it can be readily adjusted to efficiently perform its intended functions.

I am aware that minor changes in the form and construction of my basket forming machine can be made projecting forwardly from frame 29 will impinge on blank A before the forming plates are brought into contact with said blank and will hold the blank against accidental displacement when said blank is engaged by the forming plates. During the forward movement of the rods 27, those portions of the blank which form the end walls of the basket will be engaged by the corner plates 31 and will be bent against the end walls 16$^b$ of block 16 along the dotted lines A' of Figure 3. When these end portions are formed, the forward movement of the frame 29 and rods 27 will cease, being arrested by block 16, while rod 36, cross-arm 35 and yoke 40 will continue to move forward a predetermined distance.

This continued forward movement of the yoke 40 will compress springs 41 thereby subjecting the corner plates 31 and frame 29 to spring pressure which will tend to properly shape the blank and hold it in position. Simultaneously, the forward movement of arm 35 will operate frames 32 and the rocking plates 33 carried thereby on their hinged connections with frame 29 so that said plates will be brought inwardly towards block 16. The outer ends of plates 33 are bent inwardly at right angles to the inner ends thereof so as to partially enclose the end wall 16$^b$ of block 16. As before stated, plates 33 normally occupy anticlinal positions with respect to frames 32 so that when frames 32 and plates 33 carried thereby reach, during their inward travel, the positions shown in Figure 10, the inner ends of plates 33 will be arrested in their inward movement by block 16 while the remaining portions continue to move forwardly with the inner ends of said plates as pivotal points. This produces lever action with the power being applied to said plates at the point of their pivotal connection to plates 32 and the inwardly bent ends 33$^a$ performing the work of bending the flaps of the side walls of the basket along lines A$^2$, as shown in Figure 3, the side walls of the basket having been previously bent by the inward movement of the plates 33 along lines A$^3$, shown in Figure 3.

Thus, I accomplish a gradual forming or bending of the portions of the blank so that less power is required for performing the task and the blank is subjected to gradual strains which will prevent its breakage or distortion.

Furthermore, by utilizing the rocking plates as levers, the power is applied gradually to the corresponding portions of the blank and less power is required for operating said plates.

When the basket is formed, the parts occupy positions shown in Figure 2 and the machine is disengaged from its driving connections by the upward movement of bar 69 caused by roller 68 carried by the upper end of said bar 69 entering one of the notches 48$^a$ of disk 48. The operator secures the end walls of the basket by nails or staples C, and if reinforcing strips B are used, by additional fastening means D. When the nailing or stapling operation has been finished, the operator steps on the treadle 55 so as to operate bellcrank 60 and disengage roller 68 from disk 48. The machine is operated to restore rods 27, rod 36 and parts associated therewith to their normal positions. The restoring operations occur during the last half of the revolution of disk 48 and substituted for those herein shown and described without departing from the spirit of my invention.

What I claim is:

1. In a machine of the class described, a stationary block adapted to receive a blank from which the basket is formed, pivotally mounted forming plates arranged to move forwardly and adapted to swing inwardly toward said block and form the blank thereagainst, means movable relative to said block for supporting said plates, and means for actuating said plates in proper time relation with each other.

2. In a basket forming machine, a stationary block adapted to receive a blank from which a basket is to be formed, pivotally mounted forming plates movable relative to said block and arranged to co-operate with said block, actuating means for positioning said plates relative to said block, and yielding operative connections for providing lost motion engagement between said actuating means and said forming plates, whereby said plates are rocked on their pivots after being positioned relative to said block.

3. In a basket forming machine, the combination of a stationary forming block adapted to receive a basket blank, means movable into cooperative relation with said block for engaging certain portions of said blank, forming members pivotally supported on said means and movable into cooperative relation with said block for engaging certain other portions of said blank, and mechanism for actuating said means and said forming members in time relation with each other.

4. In a basket forming machine, a stationary block, a face plate movable relative to and adapted to co-operate with the block, hinged wall plates supported on and coacting with the said face plate, means for operatively positioning said face plate relative to said blocks, and means for actuating said hinged plates, the last mentioned means being operable subsequent to the positioning of said plates.

5. In a basket forming machine, a stationary forming member, movable supporting means, forming plates adjustably carried thereby and designed to co-operate with said stationary member, oppositely disposed frames pivotally mounted on said supporting means, rocking forming plates mounted on said frames, means for actuating said supporting means, and operative connections between said actuating means and said pivotal frames, whereby said frames are operable to bring said rocking plates into forming engagement with said stationary member.

6. In a basket forming machine, a stationary forming member adapted to receive a blank from which a basket is to be made, supporting means movable relative to said forming member, forming plates adjustably mounted on said supporting means, oppositely disposed frames pivotally supported on said supporting means, a pair of rocking plates adjustably carried by each frame and adapted to co-operate with said forming plates and said stationary member, means for positioning said supporting means, and means for actuating said pivotal frames whereby the rocking plates are brought into engagement with said forming member.

7. In a basket forming machine, a stationary blank-receiving member, a frame movable toward and from said block, forming plates mounted on said frame for co-operating with said block, oppositely disposed frames pivotally supported on said movable frame, rocking plates supported on said pivotal frames and adapted to gradually engage the blank from which the basket is being formed, and means for actuating said rocking plates.

8. In a basket forming machine, a stationary forming member, a frame movable towards and from said stationary member, blank-engaging plates adjustably mounted thereon, oppositely disposed frames having hinged supports on said movable frame, forming plates pivotally supported on said hinged frames and operable on their pivots during the forming operation, and means for sequentially actuating said movable frame and said pivotal plates.

9. In a basket forming machine, a stationary forming member, supporting means movable towards and away from the stationary forming member, a frame carried by said supporting means, forming plates adjustably mounted thereon, oppositely disposed frames pivotally supported on the movable frame, rocking plates mounted on said pivotal frames, means for sequentially actuating said supporting means and said pivotal frames, and means yieldingly mounted on said supporting means and projecting forwardly therefrom, said means being adapted to engage the blank in advance of said forming plates and hold said blank in position for the forming operation.

10. In a basket forming machine, a stationary member, supporting means movable toward and from the stationary member, rocking plates pivotally carried by said supporting means and normally occupying a tilted position, whereby their inner ends are adapted to co-operate with said stationary member during the forming operations in advance of the remaining portions of the plates, so that said plates are brought gradually into co-operative relation with said stationary member, and means for actuating said rocking plates.

11. In a basket forming machine, a stationary forming member adapted to receive a blank from which a basket is being made, supporting means movable relative to said stationary member, forming plates pivotally carried by said supporting means, and adapted to co-operate with said forming member, said forming plates normally occupying angular positions with respect to the abutting wall of the forming member so that said plates act as levers in moving the outer ends of said plates into co-operative engagement with the forming member.

12. In a basket forming machine, forming means movable in a position to engage the blank from which the basket is made, movable members for positioning and operating said forming means, actuating means for said movable members, a clutch member controlling said actuating means, braking means for arresting the movable members in a predetermined position, and means for simultaneously operating said clutch member and said braking means.

13. In a machine of the class described, forming means adapted to engage a basket blank, a movable member for positioning and operating said forming means, driving means for said movable member, a clutch member controlling said driving means, a treadle, connections between said treadle and said clutch member, and means operable by said treadle for arresting said movable member in a predetermined position.

14. In a basket forming machine, a stationary forming block adapted to receive a basket blank, guide supports for said blank mounted adjacent to said block, longitudinally movable supports, a frame detachably mounted thereon, forming plates adjustably carried on said frame, oppositely disposed rocking plates operatively supported on said detachable frame, a longitudinally movable member, yielding operative connections between the rocking plates and the movable member and actuating means for said movable supports and said movable member.

15. In a basket forming machine, a stationary forming member, supporting means movable relative thereto, a frame carried by said supporting means, rocking forming-plates adapted to co-operate with said stationary forming block, driving means, and means for operatively connecting said driving means with said supporting means and said rocking-plates, said connecting means having lost motion with respect to said supporting means.

16. In a basket forming machine, a stationary forming member, supporting means movable relative thereto, a frame carried by said supporting means, rocking forming-plates adapted to co-operate with said stationary forming block, driving means, means for operatively connecting said driving means with said supporting means and said rocking-plates, said connecting means having lost motion with respect to said supporting means, and retaining means on said stationary forming member for holding in position thereon basket reinforcing strips.

17. In a basket forming machine, forming plates arranged to operatively engage a basket blank, means for positioning and actuating said plates, driving means, a rotatable member operatively connecting said driving means with said actuating means, a displaceable member engaging said removable member and adapted to lock said rotatable member against rotation, whereby said plates are rendered stationary at predetermined positions, and means for simultaneously controlling said driving means and said displaceable member.

18. In a basket forming machine, a stationary forming block, longitudinally movable members, a support carried by said members and movable relative to said block, end plates pivotally mounted on said support for engaging the body portion and the end portions of a blank, side plates hingedly mounted on said support and movable inwardly toward said block for folding the side portions of said blank, driving mechanism, a reciprocating member actuated by said driving mechanism, rods pivotally connected to said side plates for rocking the same and operatively connected to said reciprocating member, and yielding operative connections interposed between said reciprocating member and said longitudinally movable members for effecting sequential operation of said end plates and said side plates.

In testimony whereof I hereunto affix my signature this 3rd day of June, 1921.

GAINES M. WALKER.